E. ZAHM.
PRESSURE REGULATOR.
APPLICATION FILED DEC. 28, 1911.
1,042,745.
Patented Oct. 29, 1912.
2 SHEETS—SHEET 2.
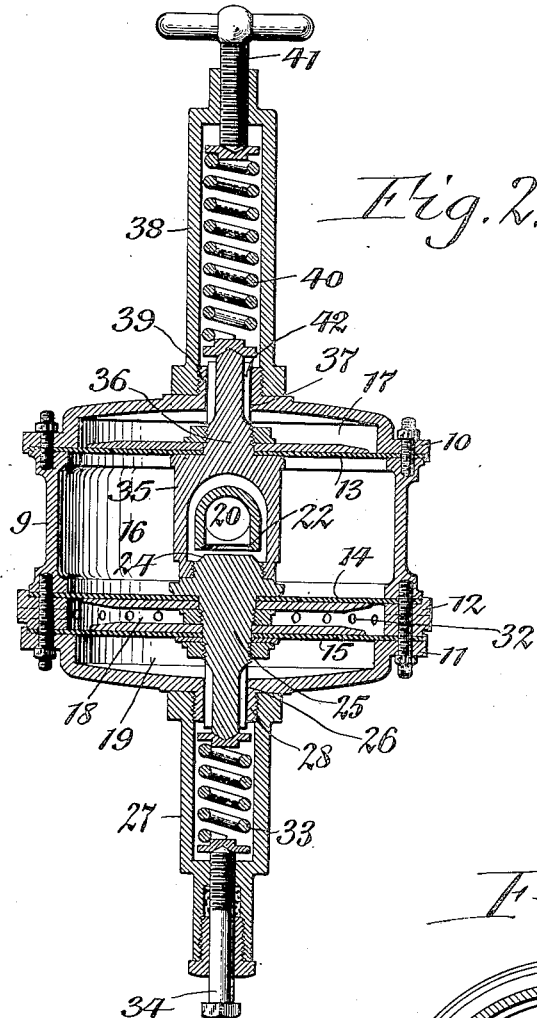
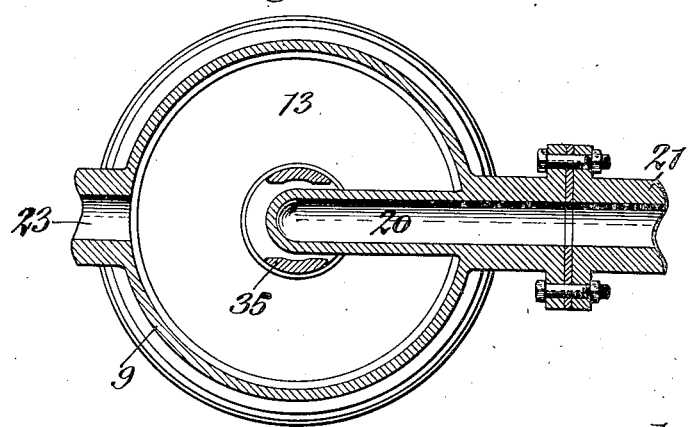
Witnesses:
Leroy S. Hodges
W. Ray Taylor
Inventor
Edward Zahm
by Peyer & Robb
Attorneys.

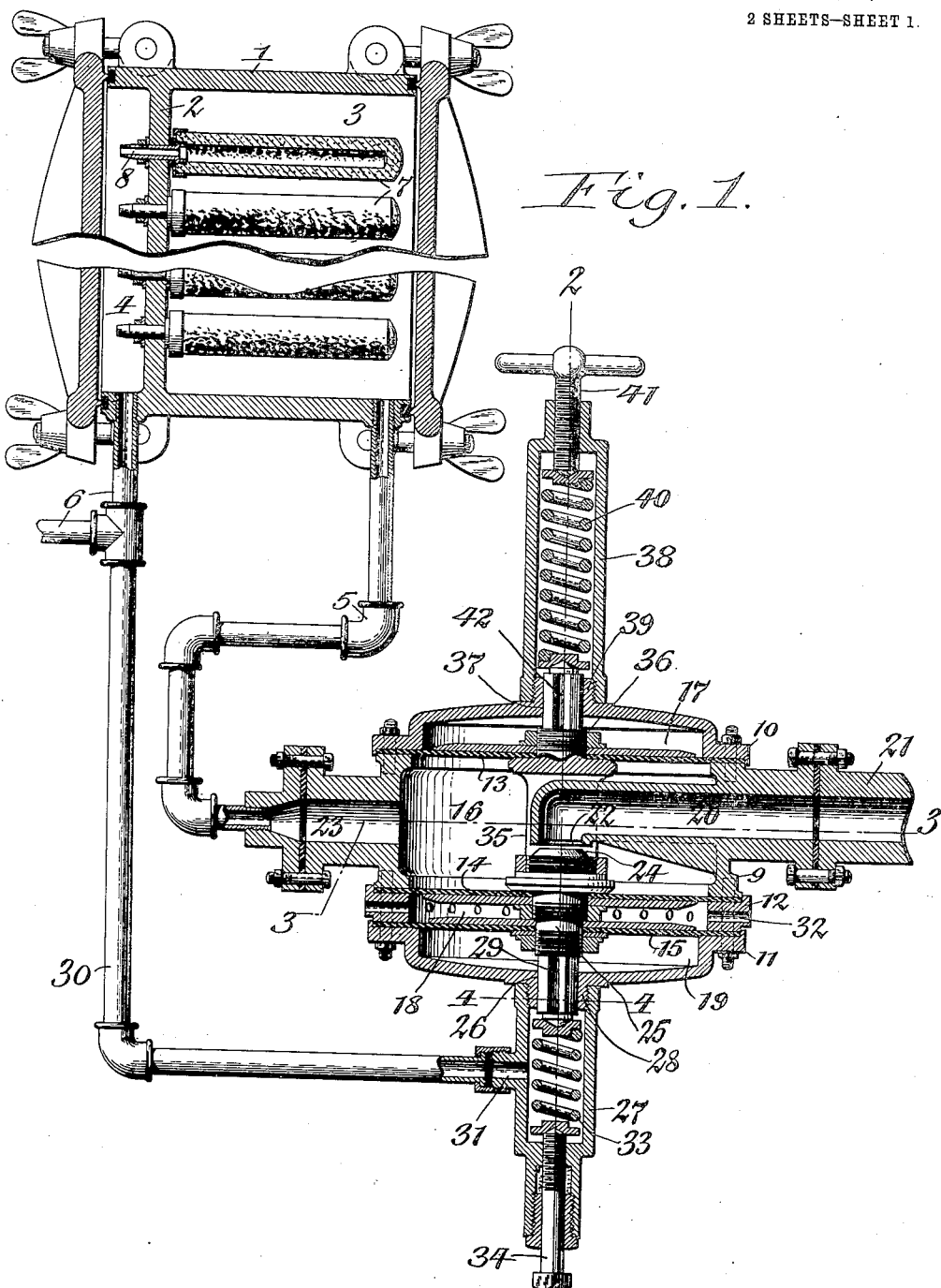

UNITED STATES PATENT OFFICE.

EDWARD ZAHM, OF BUFFALO, NEW YORK.

PRESSURE-REGULATOR.

1,042,745.  Specification of Letters Patent.  Patented Oct. 29, 1912.

Application filed December 28, 1911. Serial No. 668,330.

*To all whom it may concern:*

Be it known that I, EDWARD ZAHM, a citizen of the United States, residing at Buffalo, in the county of Erie and State of New York, have invented new and useful Improvements in Pressure-Regulators, of which the following is a specification.

This invention relates to a pressure regulator for maintaining a uniform pressure in a liquid, gas or other fluid at the place of delivery.

The pressure regulators of the character as heretofore constructed and more particularly designed for controlling the supply of liquid to a filter have usually been provided with a diaphragm which is arranged between the inlet and outlet side of the filter and which is adapted to hold a liquid supply valve in a more or less open position according to the variation in the pressure of the liquid on the outlet side of the filter. Whenever this diaphragm was perforated or cracked it was possible for some of the unfiltered liquid on one side of the diaphragm to reach the filtered liquid on the opposite side of the same and thus contaminate the filtered liquid and render the filtering operation useless.

This invention has the object of so constructing the regulator that any leakage which would be liable to occur cannot possibly reach the filtered liquid and the leakage can also be readily detected so that the necessary repairs can be made without delay.

In the accompanying drawings consisting of 2 sheets: Figure 1 is a longitudinal section of a pressure regulator embodying my invention and associated with a liquid filter. Fig. 2 is a longitudinal section of the regulator taken in line 2—2, Fig. 1. Figs. 3 and 4 are transverse sections in the correspondingly numbered lines in Fig. 1.

Similar characters of reference indicate corresponding parts throughout the several views.

In Fig. 1 of the drawings my improved pressure regulator is shown in connection with a liquid filter the supply to which is adapted to be regulated in accordance with the pressure at which it is desired to deliver the liquid from the filter. The filter here shown, for example, comprises a body 1 containing an internal partition 2 which divides the body into an inlet chamber 3 and an outlet chamber 4, a liquid inlet pipe 5 connected with the inlet chamber and adapted to supply unfiltered liquid to the inlet chamber, an outlet or delivery pipe 6 connected with the outlet chamber and adapted to deliver the filtered liquid to the place of consumption, and one or more hollow filter tubes or cores 7 arranged in the inlet chamber and each having a tubular neck 8 which projects through the partition and is secured therein. The unfiltered liquid supplied to the inlet chamber by the inlet pipe passes inwardly through the filter tubes to the interior thereof, thence through the tubular necks into the outlet chamber and then escapes through the outlet pipe to the place of consumption.

The regulator embodying my invention comprises a hollow body which is preferably composed of a main central cylindrical section 9, two outwardly dished end sections or heads 10, 11, the former being secured to one end of the central section and an intermediate section 12 of cylindrical form secured between the opposite end of the central section and the end section 11. Between opposite ends of the central body section and the adjacent end and intermediate sections 10, 12 are secured two balancing diaphragms 13, 14 which are preferably constructed of rubber. A similar diaphragm 15 is also secured between the end body section 11 and the intermediate body section 12. By this means the space within the body of the regulator is divided into a central neutral receiving chamber 16 which is arranged between the two balancing diaphragms 13, 14, a balancing chamber 17 arranged between the balancing diaphragm 13 and the end head 10, a leak chamber 18 arranged between the balancing diaphragm 14 and the regulating diaphragm 15 and a regulating chamber 19 between the regulating diaphragm 15 and the adjacent end head 11 of the body.

20 represents a fluid or liquid inlet nozzle projecting radially inward from the wall of the central body section and connected at its outer end in any suitable manner with a pipe 21 for supplying liquid which is to be filtered while its inner end is turned in a direction parallel and axially in line with the axis of the body and provided around its outlet or port with an annular valve seat 22 which is preferably of tapering form and faces the balancing and regulating diaphragms 14, 15. At another point on the periphery of the central section of the body, preferably diametrically opposite the inlet nozzle, this body is provided with an outlet nozzle 23 which communicates at its inner end with the interior of the central chamber while its outer end is connected with the inlet pipe leading to the inlet chamber of the filter.

24 represents a valve or stopper, preferably of tapering form, arranged opposite the outlet port of the liquid supply nozzle and movable axially toward and from the seat 22 of this port for the purpose of controlling the passage of liquid from the supply nozzle into the receiving chamber of the regulator and to the parts communicating therewith. This regulating valve is arranged on the inner end of a valve stem 25 which is secured to the balancing and regulating diaphragms 14, 15 and also slides in an opening 26 arranged centrally in the head 11. On the outer side of the head 11 is arranged a coupling tube 27 which forms part of the means whereby the regulating chamber 19 is connected with the outlet or delivery side of the filter. This coupling tube is preferably connected with the head 11 by means of an internal screw thread on its inner end engaging with an externally screw threaded nipple 28 formed on the outer side of this head around the opening 26 in the same. Communication between the coupling tube and the interior of the regulating chamber is produced by means of longitudinal grooves 29 formed on the periphery of the valve stem at the outer end thereof, whereby this stem is free to slide in the opening of the head 11 and still permits liquid to pass back and forth through this opening from the coupling tube to the regulating chamber and vice versa. The interior of this coupling tube is placed in communication with the outlet side of the filter so that the pressure on this side of the filter may be brought to bear on the outerside of the regulating diaphragm, this being preferably effected by a branch pipe 30 connected at one end with the delivery pipe of the filter and connected at its opposite end with a nipple 31 at the side of the coupling tube, as shown in Fig. 1. The interior of the leak chamber communicates with the exterior atmosphere, preferably by an annular row of openings 32 formed in the circular wall of the intermediate body section, as shown in Figs. 1 and 2. The regulating valve is yieldingly moved toward its seat by means of a closing spring 33 which forms part of the means for adjusting the valve in setting up or assembling the regulator. This closing spring is preferably arranged within the coupling tube 27 and bears at its inner end against the outer end of the valve stem. The tension of this spring and its closing effect upon the regulating valve may be adjusted in any suitable manner, for instance, by means of an adjusting screw 34 working in a screw threaded opening in the outer end of the coupling tube and bearing against the outer end of the closing spring.

For the purpose of setting the regulating valve according to the pressure of liquid desired on the outlet side of the filter an adjustable resisting device is provided which opposes the closing movement of the regulating valve and which is preferably constructed as follows:

35 represents a yoke or frame which straddles the inner end of the supply nozzle and connects the balancing diaphragms and associated parts. The yoke is provided with a guide stem 36 which is connected with the balancing diaphragm 13 and projects outwardly through an opening 37 formed centrally in the end head 10. On the outer side of the head 10 is mounted a guide tube 38 forming part of the means whereby a yielding tension is produced upon the yoke and connecting parts for moving the regulating valve away from the port of the supply nozzle. This guide tube is preferably secured to the head 10 by means of an internal screw thread on the inner end of its tube and engaging with an externally screw threaded nipple 39 arranged on the outer side of the head 10 around the opening 37 in which the outer end of the guide stem slides. Within the guide tube is arranged an opening spring 40 which bears at its inner end against the outer end of the guide stem. The tension of this spring may be varied by means of an adjusting screw 41 arranged in a threaded opening in the outer end of the guide tube and bearing against the outer end of the closing spring.

For the purpose of permitting the balancing diaphragm to vibrate freely the guide stem is provided with a plurality of longitudinal grooves 42 which serve to place the balancing chamber in communication with the interior of the guide tube and permit the air to pass freely from the balancing chamber into the guide tube and vice versa as the guide stem reciprocates.

In setting this regulator when installing the same the opening spring is relaxed and the tension upon the closing spring is increased by tightening the screw 34 until the regulating valve engages its seat and closes the outlet port of the supply nozzle. The tension upon the opening spring is now increased by tightening the adjusting screw 41 until the pressure of the opening spring overcomes the resistance of the closing spring and causes the regulating valve to be moved away from its seat and the outlet port of the supply nozzle to be uncovered.

The pressure which is thus applied to the regulating valve for holding the same open is determined by the amount of pressure desired on the liquid on the outlet side of the filter.

Assuming that the liquid supplied by the pipe 21 is under a pressure of twenty-five pounds and that it is desired to maintain a pressure of fifteen pounds on the outlet side of the filter or regulator, the opening spring 40 is so adjusted that when the pressure on the outlet side of the filter or regulator exceeds fifteen pounds the regulating valve will be closed more or less so that less liquid will be permitted to pass through the regulator and to the inlet side of the filter. This is due to the fact that some of the liquid on the outlet side of the filter is conducted by the branch pipe, coupling tube and regulating chamber to the outer side of the regulating diaphragm 15 which pressure together with the pressure of the closing spring operates to move the regulating diaphragm 15 inwardly and close the regulating valve more or less according as the pressure of the liquid on the outlet side of the filter exceeds fifteen pounds. When the pressure on the outlet side of the filter or regulator again drops to the normal the pressure of the liquid on the outer side of the regulating diaphragm 15 decreases in a corresponding measure, thereby again permitting the opening spring to open the regulating valve and again increasing the supply of unfiltered liquid to the inlet chamber of the filter accordingly.

If at any time a leak should occur through the diaphragm 14 due to a break in the same or a loose joint between the same and the central body section any unfiltered liquid passing from the receiving chamber through or past the diaphragm 14 will enter the leak chamber between diaphragms 14, 15 and then escape through the openings 32 to the atmosphere. By this means any leakage of unfiltered liquid past the diaphragm 14 is prevented from reaching the filtered liquid behind the diaphragm 15 and contaminating the filtered liquid as would be likely to occur if only one diaphragm were interposed between the unfiltered and filtered liquid instead of two diaphragms.

If for any reason filtered liquid should pass through the diaphragm 15 due to a break in the same or a poor joint between the same and the respective end body section 11 such leakage will also pass into the leak chamber and escape to the atmosphere through the openings 32 in the leak chamber.

Whenever liquid escapes from the openings 32 as the result of leakage through either the diaphragm 14 or the diaphragm 15, or both of them, it is evidence to the attendant that one or both these diaphragms is defective and thus serves as a warning that the regulator needs repairing in order to maintain the same in efficient condition.

Although it is preferable to employ a leak chamber between the diaphragms 14 and 15 by means of the perforated ring 12 since this produces a very strong construction this ring may be omitted in which case the space between these diaphragms opens or leads directly to the outer atmosphere.

I claim as my invention:

1. A regulator comprising a receiving chamber having a fluid inlet and an outlet, a diaphragm exposed to the pressure of the fluid in said chamber, a regulating chamber independent of said receiving chamber adapted to receive fluid discharged from the outlet of the receiving chamber, a diaphragm exposed to the pressure of the fluid in the regulating chamber, and a valve for controlling the admission of fluid through said inlet connected with said diaphragms, the space between said diaphragms leading to the outer atmosphere.

2. A regulator comprising a receiving chamber having a fluid inlet and an outlet, a diaphragm exposed to the pressure of the fluid in said chamber, a regulating chamber independent of said receiving chamber adapted to receive fluid discharged from the outlet of the receiving chamber, a diaphragm exposed to the pressure of the fluid in the regulating chamber, and a valve for controlling the admission of fluid through said inlet connected with said diaphragm, the outer sides of said diaphragms opposite to the inner liquid pressure sides thereof being exposed to the outer atmosphere.

3. A regulator comprising a receiving chamber having a fluid inlet and an outlet, a diaphragm exposed to the pressure of the fluid in said chamber, a regulating chamber independent of said receiving chamber adapted to receive fluid discharged from the outlet of the receiving chamber, a diaphragm exposed to the pressure of the fluid in the regulating chamber, a valve connected with said diaphragms and adapted to be moved for closing said inlet by the pressure of the fluid in said regulating chamber, and a spring operating to move said valve in the direction for opening said inlet the outer sides of said diaphragms opposite to the inner liquid pressure sides thereof being exposed to the outer atmosphere.

4. A regulator comprising a receiving chamber having a fluid inlet and an outlet, a diaphragm exposed to the pressure of the fluid in said chamber, a regulating chamber independent of said receiving chamber adapted to receive fluid discharged from the outlet of the receiving chamber, a diaphragm exposed to the pressure of the fluid in the regulating chamber, a valve connected with said diaphragms and adapted to be moved for closing said inlet by the pressure of the fluid in said regulating chamber, a spring operating to move said valve in the direction for opening said inlet, and a leak chamber interposed between said receiving and regulating chambers and communicating with the external atmosphere.

5. A regulator comprising a receiving chamber having a fluid inlet and an outlet, balancing diaphragms arranged within said receiving chamber on opposite sides of said inlet and outlet and exposed to the pressure of the fluid within the receiving chamber, a regulating chamber independent of said receiving chamber adapted to receive fluid discharged from the outlet of the receiving chamber, a diaphragm exposed to the pressure of the fluid in the regulating chamber, and a valve connected with said balancing and regulating diaphragms and controlling said fluid inlet of the receiving chamber.

6. A regulator comprising a receiving chamber having a fluid inlet and an outlet, balancing diaphragms arranged within said receiving chamber on opposite sides of said inlet and outlet and exposed to the pressure of the fluid within the receiving chamber, a regulating chamber independent of said receiving chamber adapted to receive fluid discharged from the outlet of the receiving chamber, a diaphragm exposed to the pressure of the fluid in the regulating chamber, a valve connected with said balancing and regulating diaphragms and controlling said fluid inlet of the receiving chamber and a leak chamber arranged between said receiving and regulating chambers and communicating with the atmosphere.

7. A regulator comprising a receiving chamber having a fluid inlet and an outlet, balancing diaphragms arranged within said receiving chamber on opposite sides of said inlet and outlet and exposed to the pressure of the fluid within the receiving chamber, a regulating chamber independent of said receiving chamber adapted to receive fluid discharged from the outlet of the receiving chamber, a diaphragm exposed to the pressure of the fluid in the regulating chamber, a valve connected with said balancing and regulating diaphragms and controlling said fluid inlet of the receiving chamber, and a spring operating to resist closing of said valve.

8. A regulator comprising a receiving chamber having a fluid inlet and an outlet, balancing diaphragms arranged within said receiving chamber on opposite sides of said inlet and outlet and exposed to the pressure of the fluid within the receiving chamber, a regulating chamber independent of said receiving chamber adapted to receive fluid discharged from the outlet of the receiving chamber, a diaphragm exposed to the pressure of the fluid in the regulating chamber, a valve connected with said balancing and regulating diaphragms and controlling said fluid inlet of the receiving chamber, and a spring operating to resist closing of said valve and a spring which assists in closing said valve.

Witness my hand this 23rd day of December, 1911.

EDWARD ZAHM.

Witnesses:
 THEO. L. POPP,
 ANNA HEIGIS.